United States Patent Office 3,431,340
Patented Mar. 4, 1969

3,431,340
MEDICINAL PREPARATION FOR THE TREATMENT OF BURNS AND OTHER TRAUMATIC WOUNDS
John Otto George, Clatskanie, Oreg. 97016
No Drawing. Continuation-in-part of application Ser. No. 388,275, Aug. 7, 1964. This application Oct. 19, 1967, Ser. No. 676,632
U.S. Cl. 424—107
Int. Cl. A61k 9/06, 27/00, 15/02
4 Claims

ABSTRACT OF THE DISCLOSURE

A medicinal preparation for the treatment of burns and other traumatic wounds consists essentially of castor oil and fish oil.

---

This application is a continuation in part of the application of John Otto George, Ser. No. 388,275, filed Aug. 7, 1964 and now abandoned.

This invention pertains to a medicinal preparation for the treatment of burns and other traumatic wounds.

Over the years, various methods have been worked out for the treatment of burns. All of these have had serious limitations.

The application of butesin picrate gave relief from pain, but was so toxic that often relatively minor burns terminated with death because of the absorption of the picrate toxins. Boric acid wet packs were less toxic, but did not prevent scaring and contractures. Tannic acid and silver nitrate were relatively ineffective.

A current method of burn treatment includes the steps of anaesthetizing the patient and scrubbing the burned area to cleanse it and remove debris. Thereafter skin grafts are applied.

The latter treatment is disadvantageous since the mortality from shock is very high. Difficult and often unsuccessful skin grafting procedures are necessary. Highly skilled medical personnel provided with elaborate equipment are required.

The net result is that at the present time the treatment of burns is non-uniform from place to place and the treatments applied are of minimum benefit. It has been said, in fact, that there has been made no real progress in the treatment of burns in the past fifty years.

It is an important purpose of the present invention to provide a medicinal preparation for the treatment of burns which is highly effective, even in the case of third degree burns involving large skin areas; which is accompanied by a lower mortality rate; which brings great relief from the pain usually accompanying burns; and which results in healing of the burned area until it is covered with good skin with a minimum of scarring and contractures.

It is a further purpose of the present invention to provide a medicinal preparation generally useful in the promotion of healing of, and the prevention of infection in, traumatic wounds of classes other than burns, such as ulcerated wounds, amputations and other surgical wounds, abrasions, and the like.

The medicinal preparation, the use of which accomplishes the foregoing and other objects consists essentially of substantially equal proportions by weight of castor oil and fish oil. The exact proportions to be employed depend upon such factors as the identity of the patient, the type of wound, the source and composition of the constituents, the identity of any fortifying agents which may be present, etc. However, in general, the two constituents may be used in the following proportions:

| | Percent by weight |
|---|---|
| Castor oil | 35–65 |
| Fish oil | 35–65 |

A preferred composition for use in the treatment of burns comprises about 40% castor oil and about 60% cod liver oil, by weight.

These two essential ingredients are used in amounts relative to each other sufficient to provide 100% by weight of essential ingredients. Additional quantities of vehicles, vitamins and other fortifying substances may be added as required.

In the above formulation, the castor oil may be the readily available commercial USP grade of commercial castor oil. It serves dramatically the function of inhibiting granulation and the growth of proud flesh. It also serves a bacteriostatic function and minimizes the odor of the fish oil.

The fish oil preferably is cod liver oil of the usual commercial grade, containing preferably not less than 1000 USP units of vitamin A and 100 USP units of vitamin D per gram. It serves to dilute the castor oil and acts as a vehicle for it. It also serves to alleviate pain, and accelerate the healing processes.

The relative proportions of essential ingredients set forth in the formulation of the invention are critical to its successful use. Although in accordance with my discovery the castor oil has the remarkable property of inhibiting granulation, if used in too large an amount it produces a raw, bleeding wound. On the other hand, if too little castor oil is employed, an accumulation of granulation tissue results.

Likewise, the amount of fish oil employed is critical to the success of the treatment. If more than the stipulated amount is employed, the activity of the castor oil in controlling the growth of granulation tissue is markedly reduced. Also excessive bacterial growth is permitted. On the other hand, if less than the stipulated proportion of fish oil is employed, the caustic qualities of the castor oil are evidenced.

There thus is a coaction between these two essential ingredients which makes them uniquely suitable for the formulation of an effective burn medicament. The castor oil prevents the growth of scar tissue, and the fish oil controls the caustic action of the castor oil, while at the same time promoting the healing of the wound.

In the treatment of burns with the presently described medicament, the preparation is applied generously to the entire burn area as quickly as possible. Repeated applications are made as needed to relieve pain. If necessary, resuscitation is started by the introduction of the conventional intravenous fluids. Pain killers, toxin neutralizers, vitamins and antibiotics may be employed as indicated.

The wound to which the medicament has been applied initially may be covered with gauze and sheet wadding and thereafter dressed daily. At the time of dressing, all devitalized tissue and crusts which can be removed readily are removed. Tissue which is attached firmly is permitted to separate normally.

The patient may be permitted to walk about after the first days. He must not be permitted to keep any part of the body in abnormal flexion. To do so will produce contractures, as occurs with any bedfast who assumes an abnormal position.

At the end of the period of treatment, which may last for a period of from several days to several weeks, the burned area will be covered with new skin which at first is thin and fragile, but which in time becomes of near normal thickness, healthy in appearance and soft and pliable. Disfiguring granulation tissue and contractures are substantially absent and the skin resumes its normal appearance.

The use of the medicinal preparation of my invention in the treatment of burns and other traumatic wounds thus is attended by manifold and significant advantages.

It promotes the healing of the burn by natural processes in dramatic fashion. It prevents infection. Its use is attended by a lower mortality rate. Pain is diminished markedly. The formation of harmful granulation tissue is prevented. The wound area becomes covered over with good quality, pliable skin. Infections developing on the wound area are minimized.

All of these advantages are obtained, furthermore, by the use of a preparation which is inexpensive, readily available and which may be applied by persons of ordinary medical training without the necessity of using elaborate and costly special equipment.

Having thus described my invention in preferred embodiments, I claim:

1. A medicinal preparation for the treatment of burns and other traumatic wounds, consisting essentially of:

| | Percent by weight |
|---|---|
| Castor oil | 35–65 |
| Cod liver oil | 35–65 |

2. The medicinal preparation of claim 1 wherein the essential constituents consist of:

| | Percent by weight |
|---|---|
| Castor oil | 35–65 |
| Cod liver oil containing at least 1000 U.S.P. units vitamin A and 100 units vitamin D per gram | 35–65 |

3. The medicinal preparation of claim 1 wherein the essential constituents consist of about 40% by weight castor oil and about 60% by weight of cod liver oil.

4. The medicinal preparation of claim 1 consisting essentially of substantially equal proportions by weight of castor oil and cod liver oil.

References Cited

UNITED STATES PATENTS 2,082,063  6/1937  Khodakoff _____ 167—58

OTHER REFERENCES

Chemical Abstracts I, vol. 45, entry 7298d, 1951, citing Seki, Japan J. Pharm. and Chem. 23, 138–42 (1951).

Chemical Abstracts II, vol. 45, entry 9173c, 1951, citing Butcher, J. Invest. Dermatol., 16, 85–90 (1951).

Rosenthal, Public Health Reports, vol. 57, No. 51, pp. 1923–1935, December 1942.

Vallance, Manufacturing Chemist, October 1940, pp. 258–261.

RICHARD L. HUFF, Primary Examiner.

U.S. Cl. X.R.

424—312